(12) United States Patent
Oak et al.

(10) Patent No.: US 6,341,147 B1
(45) Date of Patent: Jan. 22, 2002

(54) MAXIMUM LIKELIHOOD SYMBOL TIMING ESTIMATOR

(75) Inventors: Sang Soo Oak, Daegu; Woo Jin Song, Pohang; Kwang Chun Lee, Gumi, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/414,777

(22) Filed: Oct. 8, 1999

(30) Foreign Application Priority Data

Oct. 9, 1998 (KR) ............................................. 98-42273
Jun. 1, 1999 (KR) ............................................. 99-20053

(51) Int. Cl.[7] ................................................ H03D 1/00
(52) U.S. Cl. ........................ 375/341; 375/355; 714/794
(58) Field of Search ................................. 375/341, 326, 375/262, 355; 714/794

(56) References Cited

U.S. PATENT DOCUMENTS 4,794,341 A * 12/1988 Barton et al. .................. 329/50
5,878,088 A * 3/1999 Knutson et al. ............. 375/324

* cited by examiner

*Primary Examiner*—Temesghen Ghebretinsae
(74) *Attorney, Agent, or Firm*—Fleshner & Kim, LLP

(57) ABSTRACT

A maximum likelihood timing recovering unit is disclosed, which includes a sampler for over-sampling a matched filtering signal, first and second delay units for sequentially delaying a sampling signal of the sampler, a first decimeter for outputting a decision sample among an output signal of the first delay unit to a symbol decision unit, an adder for adding an output of the sampler and an output of the second delay unit, a multiplier for multiplying a decision symbol $a_k$ received in a preamble format and an output signal of the adder, a second decimeter for outputting a certain interval value based on a decision sample position among the output of the multiplier, an accumulator for accumulating the output of the second decimeter at a certain interval, and a voltage adjusting oscillator for providing an oscillation frequency generated using the output of the accumulator as an adjusting voltage to a 2Fs sampling clock signal of the sampler, for thereby recovering an optimum timing using a data over-sampled by adjusting an oscillation speed of a voltage adjusting oscillator by two times.

16 Claims, 12 Drawing Sheets

× SYMBOL DECISION VALUE
⊗ DECISION SAMPLE
○ INTERMEDIATE SAMPLE

— Roll_OFF=0.0575
---- Roll_OFF=0.3

MAXIMUM LIKELIHOOD SYMBOL TIMING ESTIMATOR

BACKGROUND OF THE INVENTION

1. Field of the Invention

The present invention relates to a digital communication, and in particular to a maximum likelihood symbol timing recovering unit for a symbol timing recovering process of a received signal.

2. Description of the Background Art

FIG. 1 is a block diagram illustrating a digital communication system of a known base bandwidth. As shown therein, the conventional digital communication system includes a transmitter 110 having a coder 111 and a transmission filter 122, a symbol decision unit 123, a decoder 124 and a timing recovering unit 125.

The operation of the conventional digital communication system will be explained.

When a binary bit BITS is inputted into the transmitter 110, the binary bit BITS is mapped in a certain alphabet by a coder 111 and is changed to a symbol $a_m$. The symbol $a_m$ is converted into an analog signal s(t) by the transmission filter 112 having an impact response g(t) and is transmitted to the communication channel 130.

At this time, the communication channel 130 has a response characteristic b(t) in the case of a wired channel and becomes a receiving signal r(t) mixed with a summing noise n(t) by a thermal noise generated in the transmitter and receiver with respect to the signal s(t) transmitted to the receiver 120 by a wire or wireless method.

In addition, in the receiver 120 which receives the receiving signal r(t), the sampling of the symbol period is performed by the sampler 122 with respect to a signal which passes through the receiving filter 121 having the impact response f(t) like the impact response g(t) of the transmission filter 112 as a transmission characteristic.

Therefore, when the symbol decision unit 123 decides the At sampled data, the measured symbol value is obtained, and this symbol value is recovered into a binary bit by the decoder 124.

At this time, the sampler 122 samples an output signal of the receiving filter 121 by a sampling clock and transmits the data to the symbol decision unit 123. The sampling clock is generated by the timing recovering unit 125 which receives a receiving signal r(t).

The operation of the above-described circuit block will be explained with reference to a pulse amplitude modulation (PAM) of FIG. 2 and a frequency spectrum of the Nyquist pulse.

In the transmitter 110, the pulse g(t) having an amplitude decided based on the value of the transmission symbol $a_m$ is generated at every symbol period T, and the thusly generated pulse g(t) is duplicated and becomes a transmission pulse s(t) which is a PAM signal as shown in FIG. 2A. The above-described operation may be implemented by the following Equation 1.

$$s(t)=\Sigma a_m g(t-mT)$$  Equation 1

The transmission pulse s(t) has a value "0" at all symbol points except for 0T'.

The receiver 120 may recover the symbol value $a_m$ at the transmission side in the case that the value is read at every symbol period nT by the sampler(or A/D converter) 122.

At this time, the operation for deciding an integrated impact response p(t) with respect to a response g(t) of the transmission filter 112, a response b(t) of the channel 130, and a response f(t) of the receiving filter 121 so that a zero cross point may occur at every symbol period nT except for OT' is called as a Nyquist criterion. This response p(t) may be expressed in the following Equation 2.

$$p(t)=g(t)*b(t)*f(t)$$  Equation 2

As shown in the spectrum of FIG. 2B, "α" is a roll-off factor. When this value varies to 0~1, the over frequency bandwidth is changed to 0%~100%.

In addition, in the spectrum, $$"0 \sim \frac{1}{2}T"$$

bandwidth is called as a signal bandwidth, and the operation for carrying the transmission symbol $a_m$ by multiple times is called as a Nyquist ratio transmission.

At this time, the frequency component at $$\frac{1}{2}T,$$

namely, at the bandwidth edge point includes a timing information which is important for the symbol timing recovery. If the over frequency is decreased, the bandwidth occupying width of the channel is decreased, and it is difficult to obtain the timing recovery.

Therefore, in the digital communication, the output of the demodulator must be periodically sampled at the timing of $t_m=mT+\tau$ based on the symbol rate.

Here, T represents a symbol interval, and τ represents a delay time which occurs during a transfer from the transmitter to the receiver.

In order to implement a periodical sampling operation, a clock signal is required for the receiver. The process for extracting the clock signal from the receiver is called as a symbol timing recovery.

Various methods for the symbol timing recovery are known.

First, in the spectrum recovering method(spectral line method), a band-pass filter is tuned at a bandwidth edge portion of the signal spectrum with respect to the receiving signal which passed through the linear or non-linear apparatus for thereby extracting a timing information.

For the binary signal, there are a method for checking a zero cross point and a method for using a point at which an inclination at the sampling time of the receiving signal becomes a timing information.

As an important factor for a selection of the timing recovering method, there are an area of the over frequency bandwidth and a level number of the signal. The case that random symbol value affects the timing information by a larger PAM signal which exceeds a certain signal level is called as a self-noise.

The circuit for the current timing recovery is directed to implementing a digital circuit.

Therefore, it is possible to enhance a reliability of the circuit operation by implementing a digital circuit for the sampling clock occurrence because that the signal process is digitally performed.

The digital implementation of the circuit for a timing recovery is obtained by a data interpolation method, a combination with a channel equalizer, etc. For example, a maximum likelihood symbol timing estimator is known.

The maximum likelihood (ML) symbol timing recovering unit uses a recovering technique for forming a likelihood function with respect to the receiving signal and estimating a timing phase for maximizing the likelihood function. The construction is different based on a DA(Data-Aided) ML, a DD(Decision-directed) ML, and a NDD (Non-Decision-directed) ML modes.

FIG. 3 is a block diagram illustrating a maximum likelihood symbol timing recovering unit using a DA(Data-Aided) ML mode as an example of the conventional art. As shown therein, the maximum likelihood symbol timing recovering unit includes a sampler 201 for sampling the matched and filtered signal at a certain period and outputting a digital signal $q_k(\hat{\tau})$ to a channel equalizer, a differential unit 202 for differentiating the matched and filtered signal, a sampler 203 for sampling the output signal of the differential unit 202 and outputting a digital signals $$\frac{d}{d\tau}q_k(\hat{\tau}),$$

a multiplier 204 for multiplying an accurate symbol $a_m$ transmitted in a preamble format and an output signal $$\frac{d}{d\tau}q_k(\hat{\tau})$$

of the sampler 203, a k-term accumulator 205 for accumulating the outputs of the multiplier 204 at the m-symbol interval of the observing period, and a voltage adjusting oscillator VCO 206 for outputting an oscillation frequency to the samplers 201 and 203 using an output value of the accumulator 205 as an adjusting voltage.

The operation of the first example of the conventional art will be explained with reference to FIG. 3.

In the conventional art for the DA-ML mode, the matched and filtered signal is inputted into the sampler 201 and the differential unit 202, and an output of the differential unit 202 is inputted into the sampler 203. The output of the sampler 203 and a symbol received in a preamble format are multiplied by the multiplier 204.

The resultant values accumulated from the multiplier 204 by the k-term accumulator 205 which performs a loop filter operation become a voltage which adjusts the voltage adjusting oscillator 206 for each k-symbol.

The output clock having its phase adjusted by the voltage adjusting oscillator 206 is inputted into the samplers 201 and 203 as a clock signal for thereby estimating the operation timing phase.

The symbol $a_k$ inputted into the multiplier 204 is a training sequence which is periodically inputted in the information symbol.

The above-described operation will be explained with reference to FIG. 1.

The base bandwidth PAM signal s(t) outputted from the transmitter 110 is expressed as a function of the phase τ based on the following Equation 3.

$$s(t;\tau) = \sum_{k=\infty}^{\infty} a_k g(t-kT-\tau) \qquad \text{Equation 3}$$

where $a_k$ represent a transmission symbol without a noise, and g(t) represents a Nyquist pulse.

At this time, as shown in Equation 3, when a signal s(t) is transmitted to the communication channel 130, a matched filtered signal r(t) which is added with an additive white gaussian noise (AWGN) and is inputted into the samplers 122 and 201 may be expressed as Equation 4, and a log likelihood function may be expressed as Equation 5.

$$r(t)=s(t;\tau)+n(t) \qquad \text{Equation 4}$$

$$\Lambda_L(\hat{\tau}) = \frac{1}{N0}\sum_k a_k q_k(\tau) \qquad \text{Equation 5}$$

In the sampler 201, the digital signal $q_k(\hat{\tau})$ may be expressed as Equation 6.

$$q_k(\hat{\tau}) = \int_{To} r(t)g(t-tK-\tau)dt \qquad \text{Equation 6}$$

In the above Equation 6, τ represents a phase estimated by the receiver 120.

Therefore, the value sampled by the phase τ of the rise integration phase of the receiving signals r(t) and g(t) becomes $q_k(\tau)$ of Equation 6.

Here, the configuration that the response f(t) of the receiving filter 121 becomes identical with the response g(t) of the transmission filter 112 in their characteristics is called as a matched filtering, and the integration interval TO=kT represents an observing interval in Equation 6.

At this time, the necessary conditions for maximizing the likelihood function $\Lambda_L(\hat{\tau})$ as shown in Equation 5 with respect to the phase $\hat{\tau}$ is implemented based on the following Equation 7.

This likelihood function is generated by the k-term accumulator 205.

$$\frac{\Lambda_L(\tau)}{d\tau} = \sum_k a_k \frac{d}{d\tau}q_k(\hat{\tau}) \qquad \text{Equation 7}$$

As seen in Equation 7, the loop is formed so that the value $$\frac{d}{d\tau}q_k(\hat{\tau})$$

sampled at a period T by the sampler 203 with respect to the output value of the differential unit 202 which differentiates the matched filtered signal, is multiplied with the symbol am transmitted in a preamble format by the multiplier 204, and a resultant value of the multiplication is outputted, and the m-term accumulator 206 accumulates the resultant values for the k-symbol of the observing interval and outputs the accumulated values as an adjusting voltage of the voltage adjusting oscillator 206 based on the adjusting voltage 0.

Namely, the k-term accumulator 205 which acts as a loop filter accumulates the output signal of the multiplier 204, and a result of the accumulation becomes an adjusting voltage of the voltage adjusting oscillator 206 for each k-symbol.

The case that the transmission symbol value at the side of the receiver 120 is involved in the training mode. This method is called as a DA-ML mode(Data-Aided ML mode).

On the contrary, a certain operation is needed to obtain an average of the likelihood function $\Lambda_L(\hat{\tau})$ of Equation 7 based on the probability of the symbol $a_k$ not to use an accurate symbol value $a_k$ received in a preamble format.

At this time, the average $/\Lambda_L(\hat{\tau})$ of the log likelihood function $\Lambda_L(\hat{\tau})$ using the probability of the symbol $a_k$ based on the gaussian distribution may be expressed as Equation 8.

$$/\Lambda_L(\tau) = \frac{1}{2N0} \sum_{k=\infty}^{\infty} q_k^2(\hat{\tau}) \qquad \text{Equation 8}$$

In order to search the phase τ for maximizing the value of Equation 8, a certain adjusting voltage is obtained for the voltage adjusting oscillator 206 so that the differentiated value of Equation 8 becomes 0 with respect to the phase τ.

$$\frac{d}{d\tau}\sum_k q_k^2(\hat{\tau}) = 2\sum_k q_k(\tau)\frac{dqk(\hat{\tau})}{d\tau} = 0 \qquad \text{Equation 9}$$

This method is called as a NDA-ML(Non-Data aided ML).

The NDA-ML mode may be classified into a DD-ML or NDD-ML mode, and the circuit may be constructed based on each mode as shown in FIGS. 4 and 5.

FIG. 4 is a block diagram illustrating a maximum likelihood symbol timing recovering unit using a DD-ML mode according to a second example of the conventional art. As shown therein, there are provided samplers 201 and 203, a differential unit 202, a k-term accumulator 205, a voltage adjusting oscillator 206, a symbol value estimator 212 for estimating a symbol $a_k$ based on a digital signal $q_k(\hat{\tau})$ from the sampler 201, and a multiplier 211 for multiplying the symbol from the symbol value estimator 212 and the output signal $$\frac{d}{d\tau}q_k(\hat{\tau})$$

of the sampler 203 and outputting to the k-term accumulator 205.

FIG. 5 is a block diagram illustrating a maximum likelihood symbol timing recovering unit using a NDD-ML mode according to a third example of the conventional art. As shown therein, there are provided samplers 201 and 203, a differential unit 202, a k-term accumulator, a voltage adjusting oscillator 206, and a multiplier 213 for multiplying a digital signal $q_k(\hat{\tau})$ from the sampler 201 and an output signal $$\frac{d}{d\tau}q_k(\hat{\tau})$$

from the sampler 203.

As shown in FIGS. 4 and 5, the operations of the second and third examples are different in their multiplications. The different operation therebetween will be explained.

When the sampler 201 samples the matched filtered signal and outputs the digital signal $q_k(\hat{\tau})$ to the channel equalizing unit, in the second example of FIG. 4, the symbol value estimator 212 receives the digital signal $q_k(\hat{\tau})$ and estimates a symbol $a_k$ and inputs the same into the multiplier 211, and in the third example of FIG. 5, the digital signal $q_k(\hat{\tau})$ is directly inputted into the multiplier 213.

At this time, the multipliers 211 and 213 multiply the digital signal $$\frac{d}{d\tau}q_k(\hat{\tau})$$

from the sampler 203 and the output signal from the sampler 201 and outputs a result of the multiplication to the k-term accumulator 205.

Therefore, the k-term accumulator 205 which performs a loop filter operation accumulates an output signal from the multiplier 204 and outputs the same as an adjusting voltage of the voltage adjusting oscillator 206 at each k-symbol, so that an output clock of the voltage adjusting oscillator 206 in which the phase τ is adjusted is inputted as the clock signals of the samplers 201 and 203 for thereby optimally estimating the operation timing phase.

In the conventional art, the differential operation is performed with respect to the matched filtered signal which is in an analog signal state before the sampling is performed. The differential unit 202 has a group delay and generates an off-set of a sampling clock signal when the signal is not delayed at a previous circuit of the sampler 201 as long as a certain delay time.

Therefore, in the conventional art, if the sampling position is moved toward a certain position at a distance from the accurate position, an error may be increased as a result of the decision which is made using the sampled value.

In addition, in the conventional art, the analog circuit (differential unit 202) and the digital circuit are co-used, so that a signal processing process is complicated and a signal processing speed is decreased.

SUMMARY OF THE INVENTION

Accordingly, it is an object of the present invention to provide a maximum likelihood timing recovering unit which is capable of recovering an optimum timing using a data over-sampled by adjusting an oscillation speed of a voltage adjusting oscillator by two times.

In the present invention, it is possible to remove a conventional complicated signal process by removing a timing off-set which occurs when obtaining a decision strobe sample by providing a delay unit having a delay value which is the same as a group delay amount of an analog differential unit, removing one sampler and substituting a conventional analog differential unit with a digital differential unit.

In the DD-ML mode and SD(sign Decision) 0ML mode, the oscillation speed of the voltage adjusting oscillator is controlled to be same as the symbol ratio sampling speed for thereby recovering an optimum timing.

In a maximum likelihood symbol timing recovering unit, an approximate inclination is obtained at a sampling point using two delay units, and a decision sample(strobe) is multiplied with the inclination or a symbol decision value or a code of a decision sample.

In a digital communication system which has a symbol timing recovering unit for a recovering operation by periodically sampling a receiving signal according to the present invention, the symbol timing recovering unit includes a sampler for over-sampling a matched filtering signal, first and second delay units for sequentially delaying a sampling signal of the sampler, a first decimeter for outputting a decision sample among an output signal of the first delay unit to a symbol decision unit, an adder for adding an output of the sampler and an output of the second delay unit, a multiplier for multiplying a decision symbol $a_k$ received in a preamble format and an output signal of the adder, a second decimeter for outputting a certain interval value based on a decision sample position among the output of the multiplier, an accumulator for accumulating the output of the second decimeter at a certain interval, and a voltage adjusting oscillator for providing an oscillation frequency generated using the output of the accumulator as an adjusting voltage to a 2Fs sampling clock signal of the sampler.

The accumulator may be substituted with a multiplier which is capable of multiplying a certain sept coefficient with an output of a second decimeter and outputting a result of the multiplication to a voltage adjusting oscillator.

In addition, in the case of the SA-ML mode and DD-ML mode, two decimeters may be removed by implementing a symbol ratio sampling speed.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
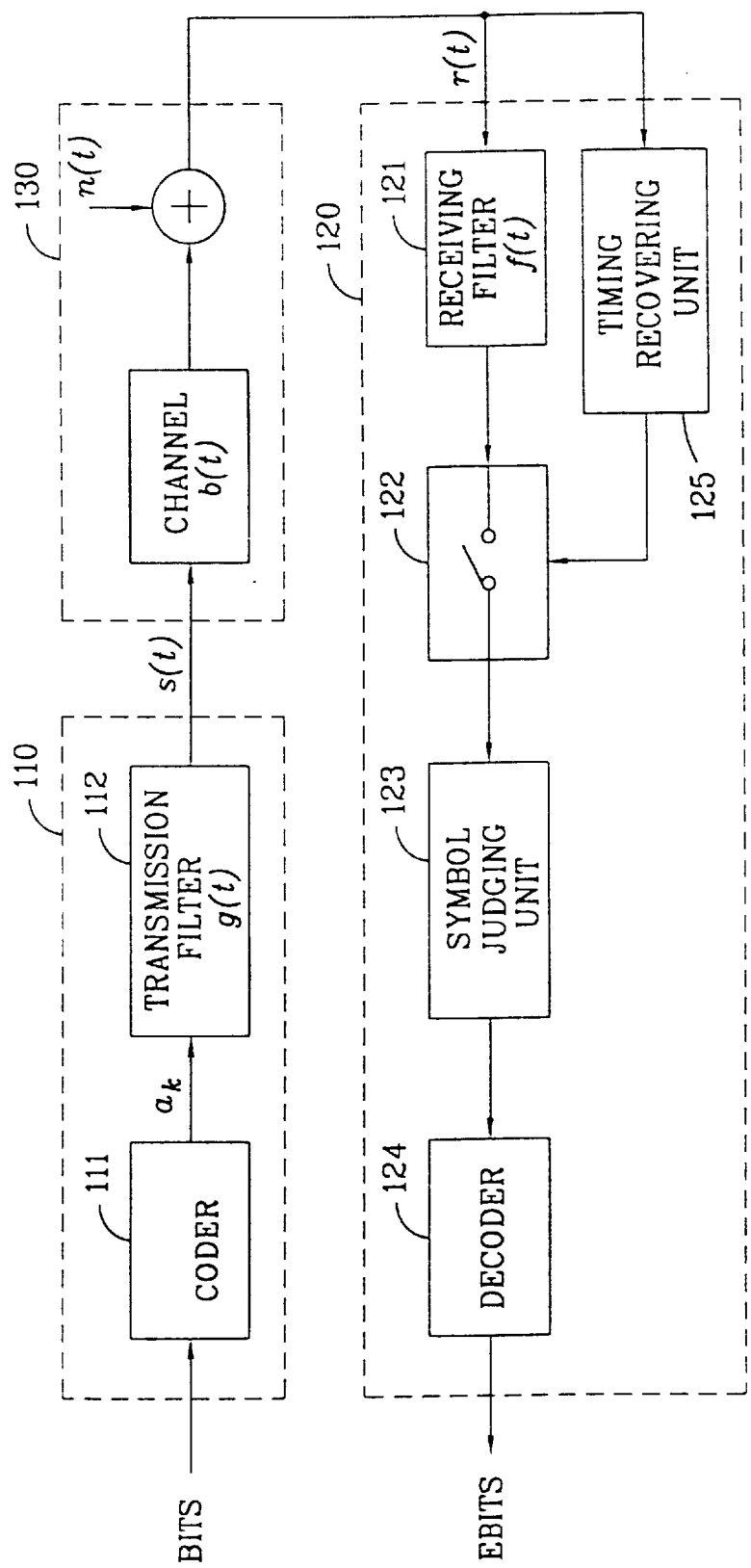
FIG. 1 is a view illustrating the construction a base bandwidth digital communication system.
Figure 2A:
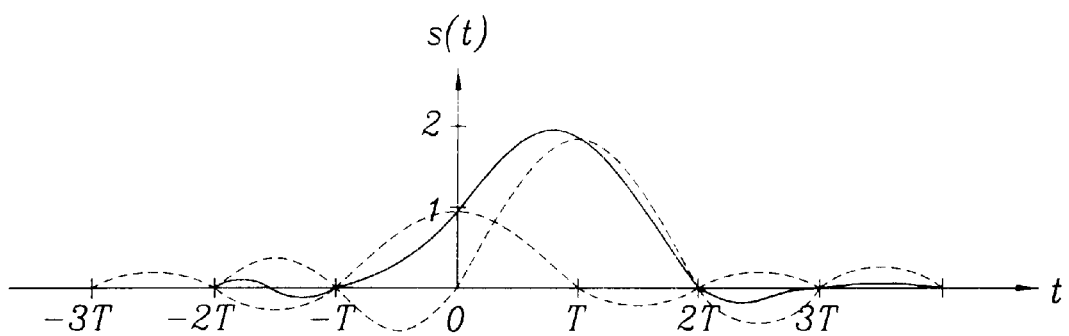
FIGS. 2A and 2B are wave form diagrams illustrating a conventional PAM signal and Nyquist pulse.
Figure 2B:
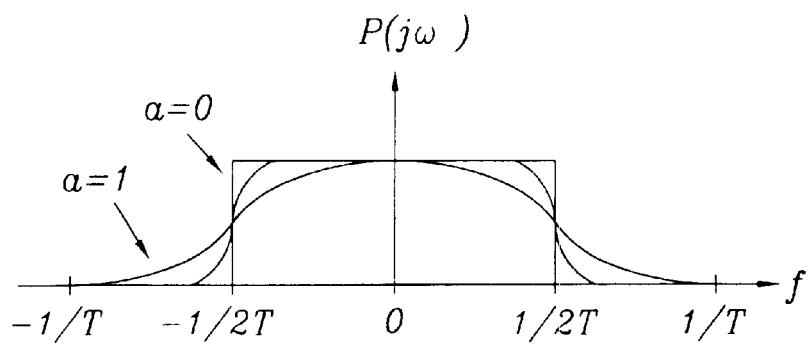
Figure 3:
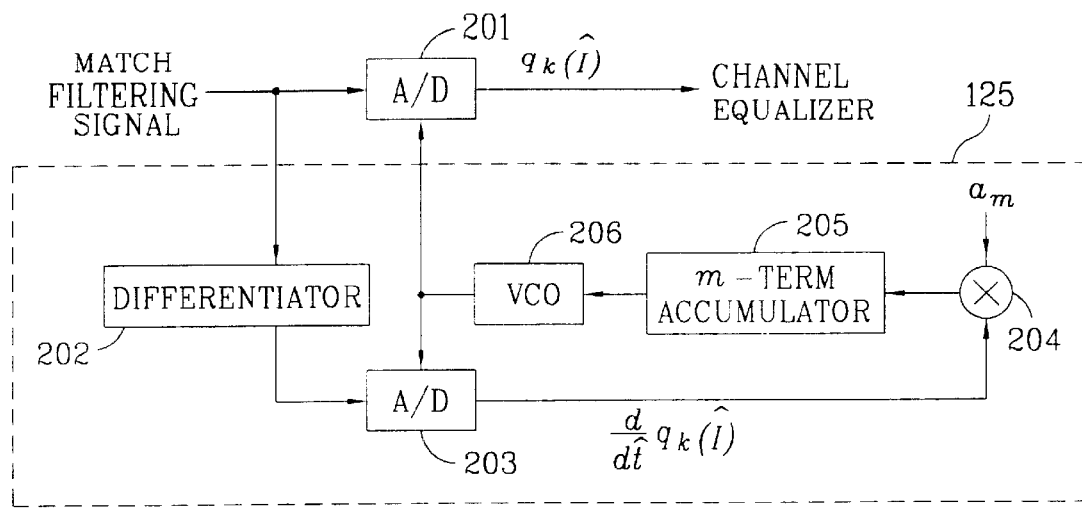
FIG. 3 is a block diagram illustrating a timing recovering unit using a DA-ML mode of a first example in the conventional art.
Figure 4:
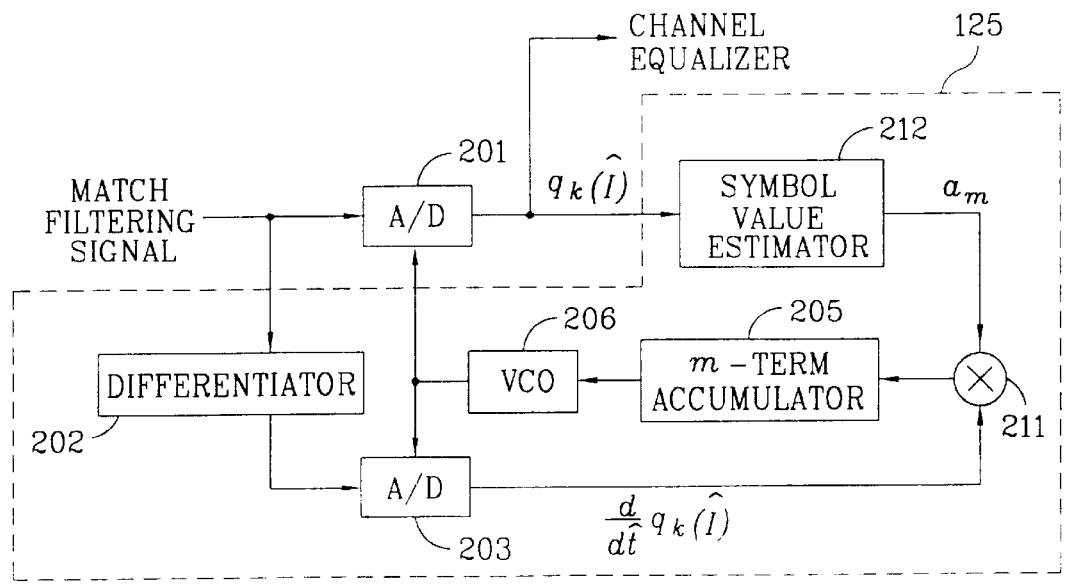
FIG. 4 is a block diagram illustrating a timing recovering unit using a DD-ML mode of a second example in the conventional art.
Figure 5:
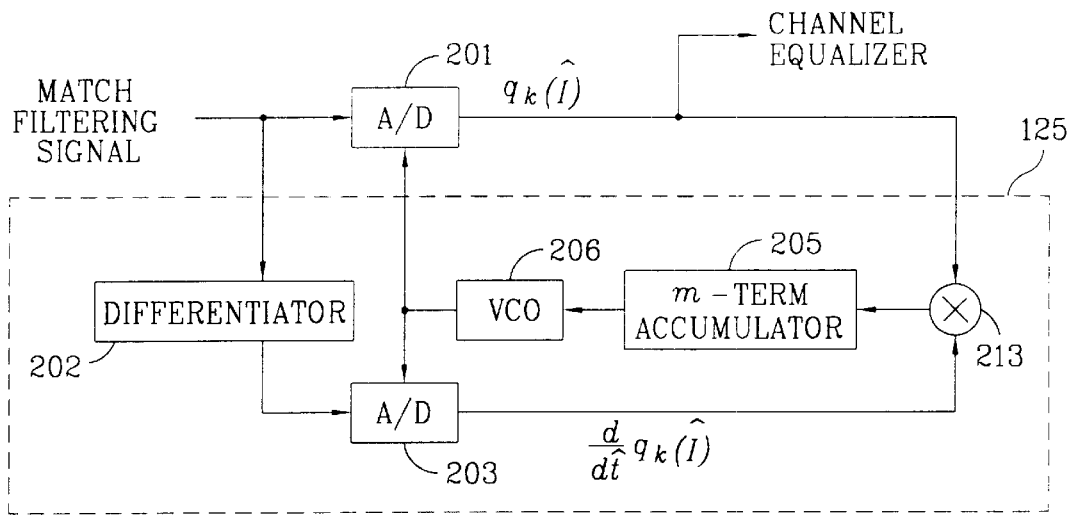
FIG. 5 is a block diagram illustrating a timing recovering unit using a NDD-ML mode of a third example in the conventional art.
Figure 6:
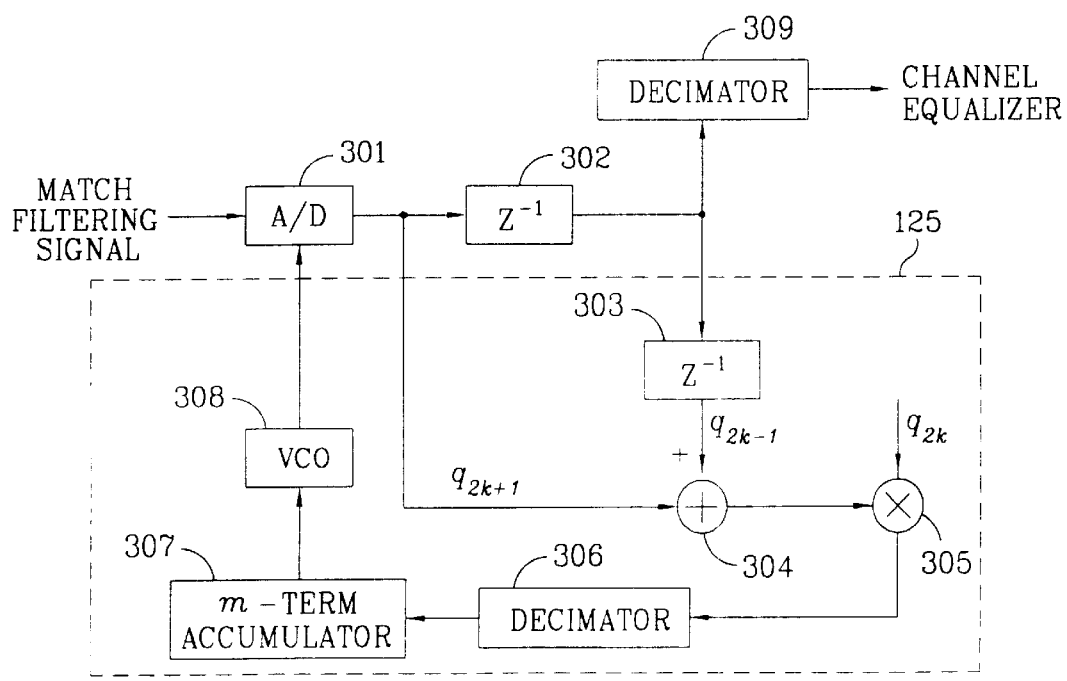
FIG. 6 is a block diagram illustrating a timing recovering unit using a NDD-ML mode according to a first embodiment of the present invention.

FIG. 6 is a block diagram illustrating a maximum likelihood symbol timing recovering unit using a DA-ML mode according to a first embodiment of the present invention which includes a sampler 301 for sampling a matched filtering signal at a certain period, delay units 302 and 303 for sequentially delaying the matched filtering signal for a certain time, an adder 304 for adding an output of the sampler 301 and an output of the delay unit 303, a multiplier 305 for multiplying an accurate symbol $a_m$ received in a preamble format(a previously set symbol sequence, and a training symbol) and an output of the adder 304, a decimeter 306 for decimating an output of the multiplier 305, an accumulator 307 for accumulating an output of the decimeter 306 at a certain symbol period, a voltage adjusting oscillator 308 for adjusting an oscillation frequency using an output of the accumulator 307 as an adjusting voltage and providing an oscillation frequency to the sampler 301, and a decimeter 309 for decimating an output of the delay unit 302 and outputting to the channel equalizer 309.

At this time, when the decimeter 306 decimates a certain symbol with respect to the output of the multiplier 305, the m-term accumulator 307 accumulates the output of the decimeter 306 at a period of the m number of the symbols. Here, m represents the number of the observing symbols.

When the accumulator 307 output the value accumulated at a period of the m number of the symbols to the voltage adjusting oscillator 308, the voltage adjusting oscillator 308 generates an over sampling clock signal using the accumulated value as an adjusting voltage.

Therefore, When the sampler 301 samples the matched filtering signal $r(\tau)$ in accordance with the over sampling clock signal from the voltage adjusting oscillator 308, the delay 302 delays the same for a certain time, and the thusly delayed signal is decimated by the decimeter 309 at a certain symbol period and outputs to the channel equalizer.

The symbol $a_m$ received in a preamble format is a training signal and may not be used.

Figure 7:
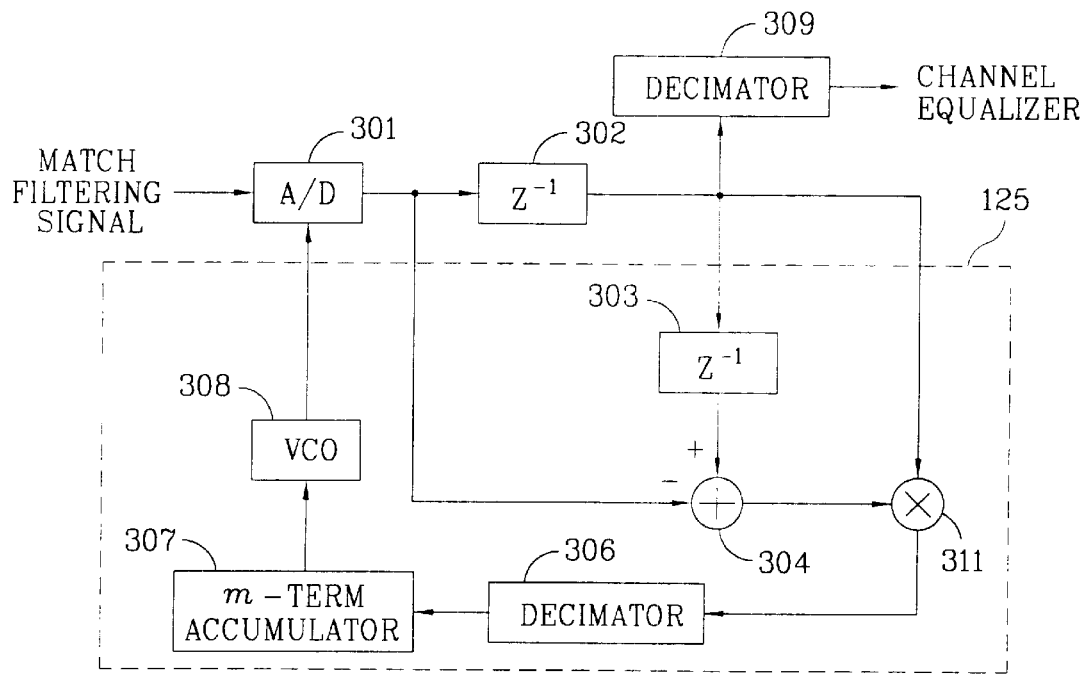
FIG. 7 is a block diagram illustrating a timing recovering unit using a NDD-ML mode according to a second embodiment of the present invention.
Figure 8:
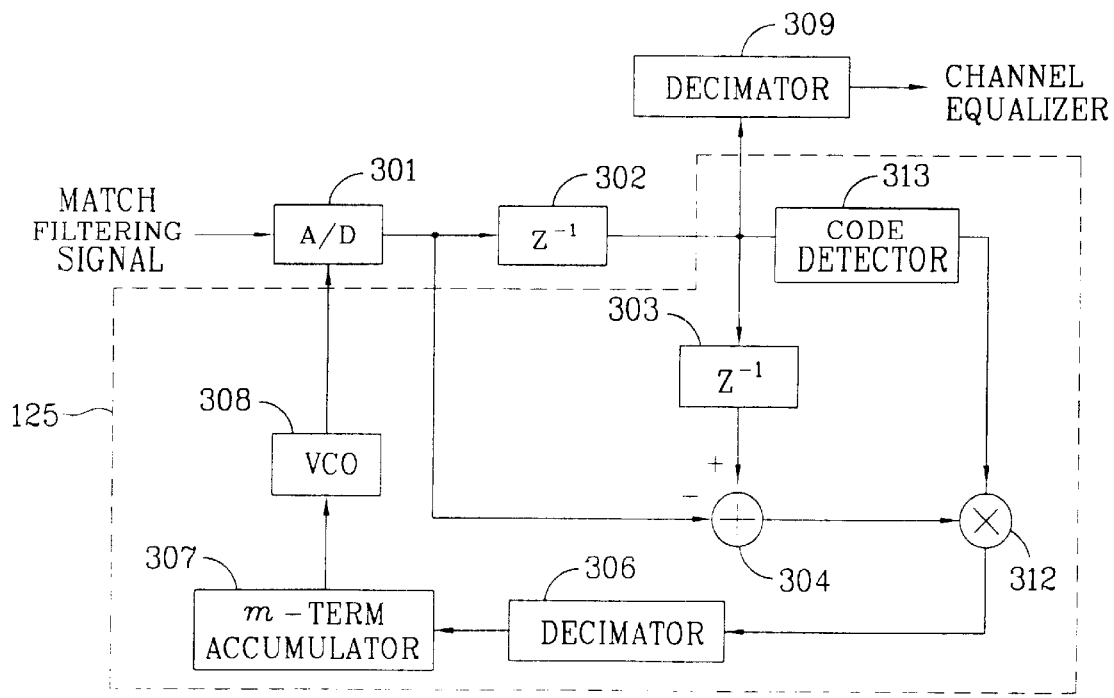
FIG. 8 is a block diagram illustrating a timing recovering unit using a SA-ML mode according to a third embodiment of the present invention.

FIG. 7 illustrates the second embodiment of the present invention, and FIG. 8 illustrates the third embodiment of the present invention.

Namely, FIG. 7 is a block diagram illustrating a maximum likelihood symbol timing recovering unit using a NDD-ML mode according to a second embodiment of the present invention. As shown therein, there are provided a sampler 301, delay units 202 and 303, an adder 304, decimeters 306 and 309, a m-term accumulator 307 and a voltage adjusting oscillator 308. In addition, there is further provided a multiplier 311 for multiplying an output of the delay unit 302 and an output of the adder 304 and outputting a result of the multiplication to the decimeter 306.

FIG. 8 is a block diagram illustrating a maximum likelihood symbol timing recovering unit using a SD(Sign Decision) ML mode according to a third embodiment of the present invention. As shown therein, there are provided a sampler 301, delay units 302 and 303, an adder 304, decimeters 306 and 309, a m-term accumulator 307, a voltage adjusting oscillator 308, a code detector 313 for deciding a code +1 or −1 using the output of the delay unit 302 as an input, and a multiplier 312 for multiplying an output of the code detector 313 and an output of the decimeter 306 and outputting a result of the multiplication to the decimeter 306.

The operation of the second and third embodiments of the present invention will be explained with reference to the accompanying drawings.

In the second and third embodiments of the present invention, the sampler 301, the delay units 302 and 303, the adder 304, the decimeters 306 and 309, the m-term accumulator 307, and the voltage adjusting oscillator 308 are configured identically to the first embodiment of the present invention and are operated identically thereto. Therefore, only the different constructions and operations will be explained.

In the second embodiment of FIG. 7, the adder 304 adds an output of the sampler 301 and an output of the delay unit 303, and the multiplier 311 multiplies an output of the delay unit 302 and an output of the adder 304 and outputs to the decimeter 306. In the third embodiment of FIG. 8, when the code detector 313 decides the code +1 or −1 by receiving an output of the delay unit 302 as an input, the multiplier 312 multiplies an output of the code detector 313 and an output of the adder and outputs to the decimeter 306.

At this time, the output of the decimeter 306 is accumulated by the m-term accumulator 307 at a period of the m number of symbols and is outputted as an adjusting voltage of the voltage adjusting oscillator 308.

Therefore, when the voltage adjusting oscillator VCO 308 generates an over sampling clock, the sampler 301 samples the matched filtering signal r(τ) based on an over sampling clock signal for thereby estimating an optimum operation timing in the same manner as the first embodiment.

Figure 18:
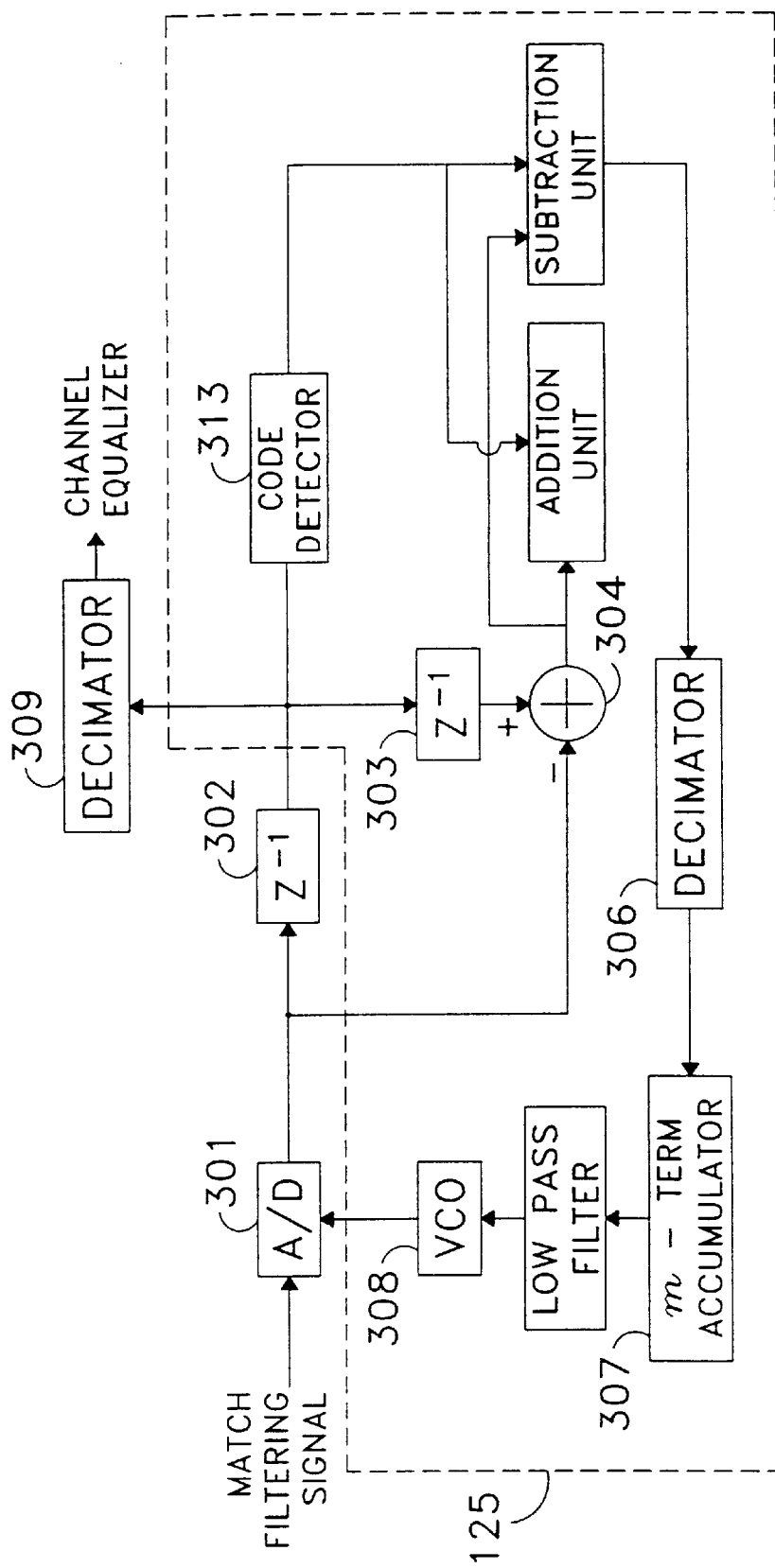
FIG. 18 is a block diagram illustrating an alternative structure according to a third preferred embodiment of the present invention.

In the third embodiment of the 6present invention for the SA-ML mode, the multiplier 312 may be substituted with an addition and subtraction unit as shown in FIG. 18.

Figure 13:
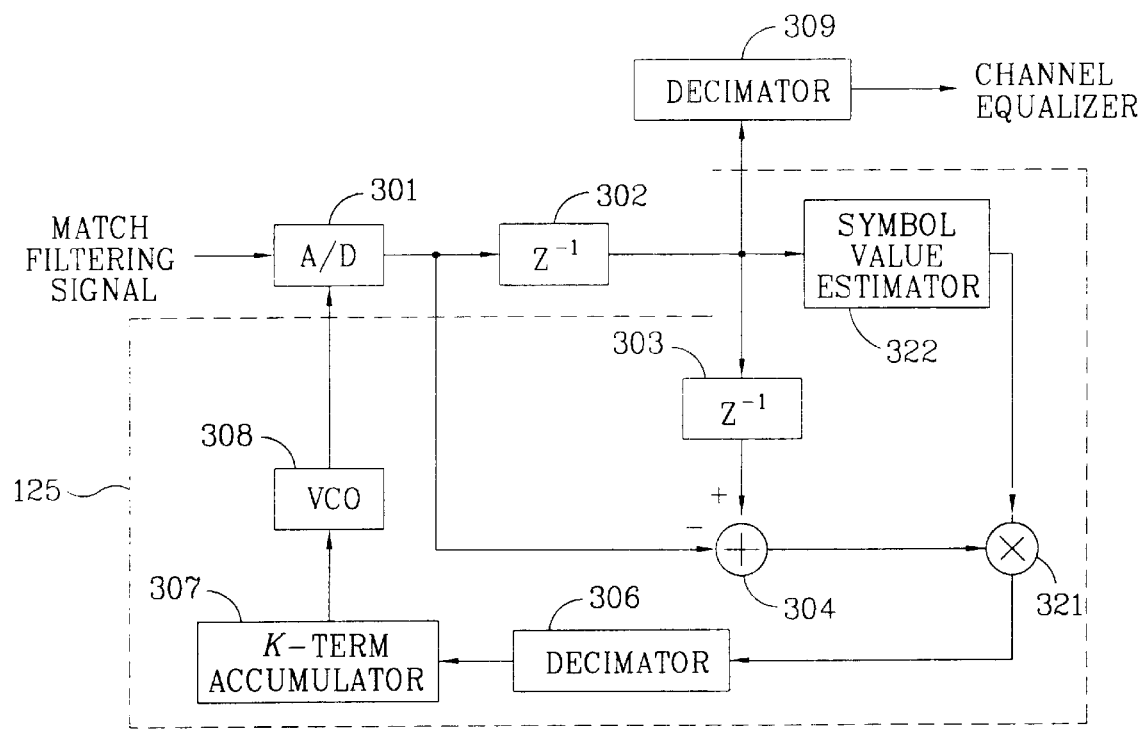
FIG. 13 is a block diagram illustrating a timing recovering unit using a DD-ML mode according to a fourth embodiment of the present invention.

FIG. 13 is a block diagram illustrating a maximum likelihood symbol timing recovering unit using a DD-ML mode according to a fourth embodiment of the present invention. As shown therein, there are provided a sampler 301, delay units 302 and 303, an adder 304, decimeters 306 and 309, a m-term accumulator 307, a voltage adjusting oscillator 308, a symbol value estimator 322 for estimating a symbol $a_k$ using an output of the delay unit 302 as an input, and a multiplier 321 for multiplying an output of the symbol value estimator 322 and an output of the adder 304.

The operation of the fourth embodiment of the present invention will be explained with reference to the present invention.

In the fourth embodiment of the present invention, the sampler 301, the delay units 302 and 303, the adder 304, the decimeters 306 and 309, the m-term accumulator 307 and the voltage adjusting oscillator 308 are formed in the same manner as the first embodiment. Therefore, the description thereof will be omitted except for the different elements.

When the outputs of the sampler 301 are sequentially delayed by the delay units 302 and 303, the symbol am is estimated using the output of the delay unit 302 as an input and outputs to the multiplier 321.

The adder 304 adds an output of the sampler 301 and an output of the delay unit 303, and the multiplier 321, multiplies an output value from the symbol value estimator 322 and an output from the adder 304 and outputs a result of the multiplication to the decimeter 306.

When the k-term accumulator 307 accumulatively outputs an output of the decimeter 306 at a period of the k number of symbols, the voltage adjusting oscillator 308 generates an over sampling clock signal using an output of the decimeter 306 as an adjusting voltage.

Therefore, when the voltage adjusting oscillator VCO 308 generates an over sampling clock signal, the sampler 301 samples the matched filtering signal r(τ̂) based on the over sampling clock signal for thereby estimating an optimum operation timing in the same manner as the first embodiment of the present invention.

In the present invention, the conventional analog differential unit is co-used with the delay units 302 and 303 and the adder 304 for thereby implementing an approximate digital circuit. In the case of sampling the symbol ratio, the differential filtering operation is performed based on the following Equation 11.

$$\frac{dqk(\hat{\tau})}{d}\tau \cong (q_{k+1} - q_{k-1})/T \qquad \text{Equation 11}$$

Here, the difference ($q_{k+1}-q_{k-1}$) between the one symbol earlier value and the one symbol later value becomes an approximate inclination at the sampling position.

However, in the case of the symbol ratio sampling, the thusly detected timing information has a lot amount of quivering information. The degree of the quivering is known based on S-curve which represents an expected value of the timing information based on the moved degree of the timing phase.

The distributed value which represents the degree of the quivering of the timing phase is involved in the obversing interval and the differential value of the Nyquist pulse, in particular, the size of the differential value of the bandwidth margin component is determined based on the following equations.

$$\text{Var}(\hat{\tau}) \propto \frac{N0}{E(a^2)kD} \qquad \text{Equation 12}$$

$$D = \int_{-\infty}^{\infty} g^2(t)dt \qquad \text{Equation 13}$$

where D represents an energy of the differential value of the Nyquist pulse g(t), and $N_0$ represents a density of the spectrum, and $E(a^2)$ represents a distribution of the transmission symbol, namely, the energy.

Namely, as seen in Equations 12 and 13, if the over frequency bandwidth is increased, the distribution is decreased for thereby obtaining a stable timing.

In addition, the s-curve of the symbol ratio sample may be expressed in the following Equation 14 by a sin function using the phase τ as a variable.

$$U_t(\tau) = \frac{4\sigma a^2}{4}\sin\left(\frac{2\pi t}{T}\right)\int_0^{1/T} G(f)G\left(\frac{1}{T} - f\right)\sin(2\pi fT)dt \qquad \text{Equation 14}$$

Namely, the size of the s-curve is affected by the value obtained by integrating the value obtained by multiplying the G(f) and $$G\frac{1}{T-f}$$

with sin( 2πft) with respect to the interval of $$0 \sim \frac{1}{T}.$$

Figure 10A:
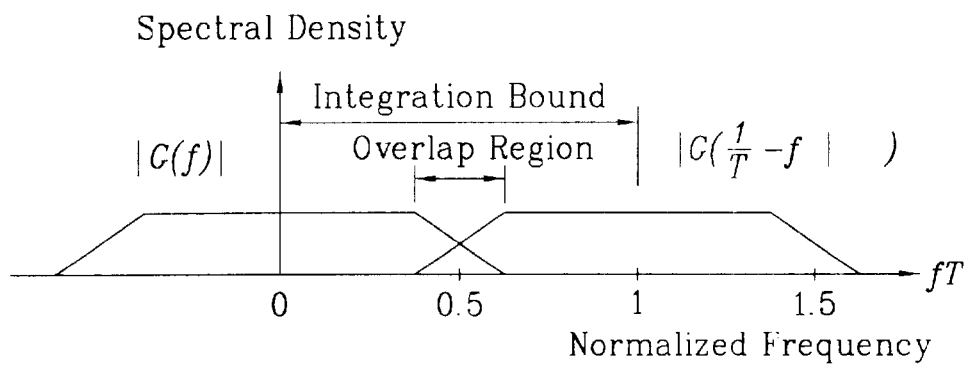
FIGS. 10A through 10C are wave form diagrams illustrating a duplicate characteristic of a differential frequency according to the present invention.
Figure 10B:
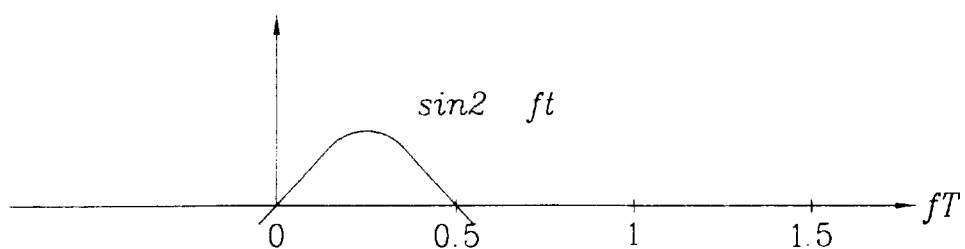

In addition, FIG. 10A illustrates the spectrum of the Nyquist pulse and its shifted version, and FIGS. 10B and C illustrate the frequency characteristic of the differential unit by the symbol ratio sampling.

As shown in FIG. 10A, the over-lapped region includes a timing information, and as it is formed near the blocking region of the differential unit, the timing information is not properly detected.

Figure 9:
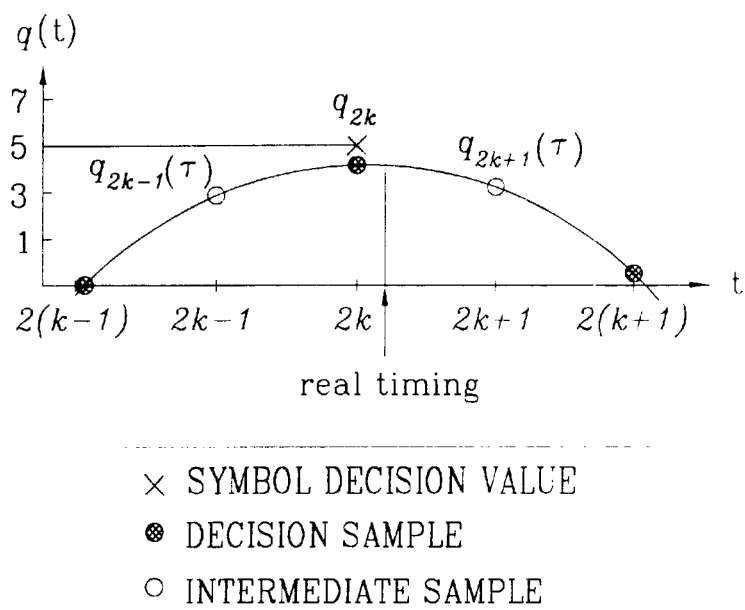
FIG. 9 is a wave form diagram of a probability path of a 8-level PAM signal according to the present invention.

Therefore, in order to overcome the problems that the timing information is not properly detected, the over sampling method is used. FIG. 9 illustrates the probability path of the PAM signal to explain the operation for obtaining a differential value with respect to the over-sampled data.

FIG. 9 is a view illustrating a sample position of the double sampling( 2Fs, two times the symbol ratio) with respect to an 8-level PAM signal.

In this case, it is possible to obtain a more reliable inclination information by computing the values at an intermediate position rather than using the difference between values which are spaced-apart by one symbol in order to obtain a differential value from the decision sample position 2k.

At this time, it is possible to obtain a proper timing by adjusting the oscillation frequency of the voltage adjusting oscillator 308 so that the inclination becomes 0.

Figure 10C:
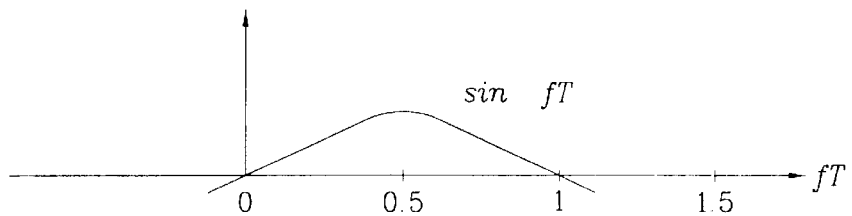

Namely, in the S-curve for the over sampling, since $sin(2\pi fT)$ of the integration portion of Equation 14 is substituted with $sin(\pi fT)$ for thereby obtaining a frequency characteristic as shown in FIG. 10C, the overlapped region is tuned at the intermediate of $sin(\pi fT)$ for thereby extracting a proper timing information.

In addition, the decimeter 309 is used for transmit only decision sample which is over-sampled among the data to the symbol decision unit 123, and the timing information computed at the decision sample position is transmitted to the m-term accumulator.

The difference value of the decision sample values are not used.

However, in the PAM signal, if the number of the levels of the symbol is increased, the quivering due to the self-noise is increased, and in the case that an over frequency bandwidth is small, the quivering is increased.

Therefore, if the observing symbol number K of the k-term accumulator 307 which accumulates the differential values without varying the receiving signal for the maximum likelihood(ML) symbol timing recovering operation is largely increased, it is possible to obtain a stable timing.

If the timing update period is over-extended by increasing the observing symbol number K, since the timing drift is not adapted during the voltage adjusting oscillation by the transmission and receiving operation, a proper adjusting operation is needed.

Figure 11A:
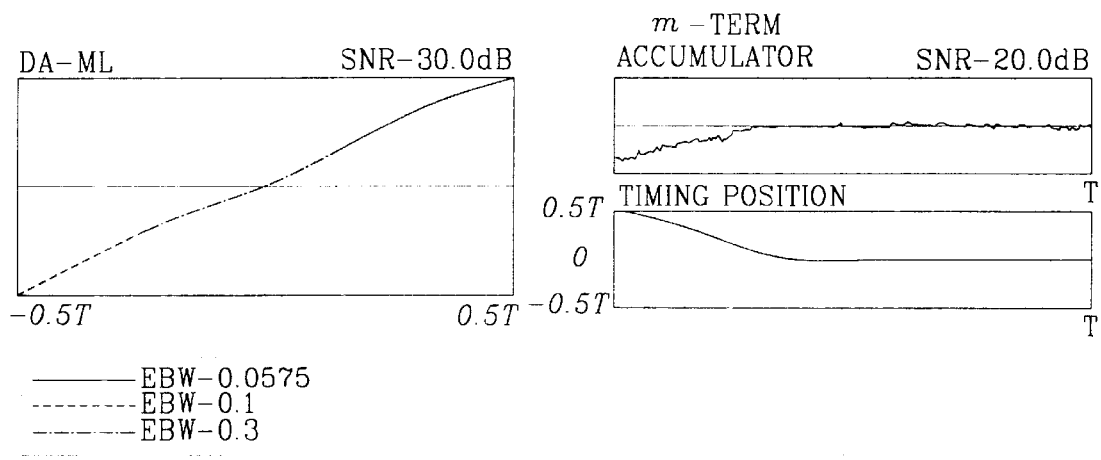
FIGS. 11A through 11C are wave form diagrams illustrating an initial timing recovering performance according to first through third embodiments of the present invention.
Figure 11B:
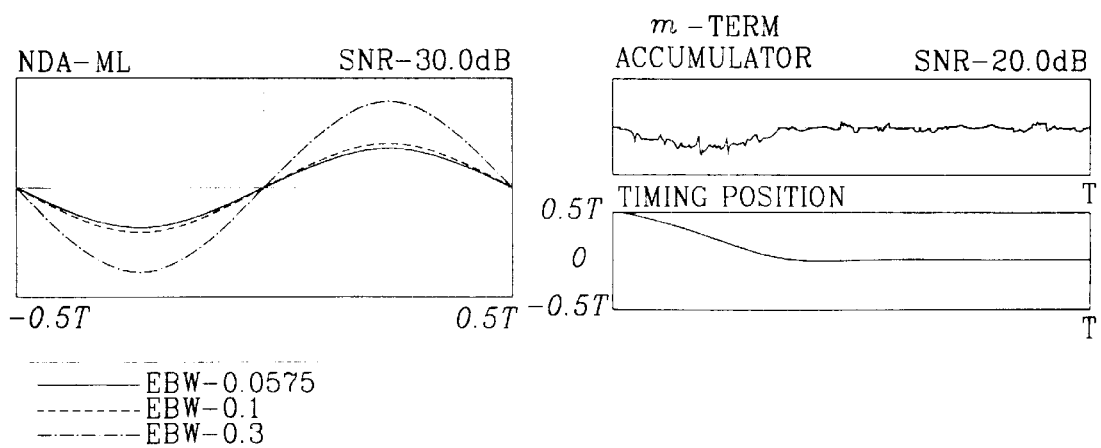

In addition, FIG. 11 is a view illustrating an initial timing recovering performance at the mode-based S-curve and each mode. As shown therein, the s-curve is formed by moving the initial timing phase in the left and right directions by one symbol in order to check the performance of the timing obtaining by simulating based on the over frequency bandwidth(EBW, a) assuming the worst occasion.

The adjusting voltage of the voltage adjusting oscillator 307 is simplified. In the case of the positive value, namely, in the case of the rightward negative value, the value is moved by one step in the leftward direction, and the symbol is processed. The phase is moved to the decision sample position 2k.

As described above, as the amplitude is increased, a proper s-curve is obtained, and a linearity is excellent irrespective of the size of the over frequency bandwidth in a toothed wave form, not a continuous sin function.

Figure 11C:
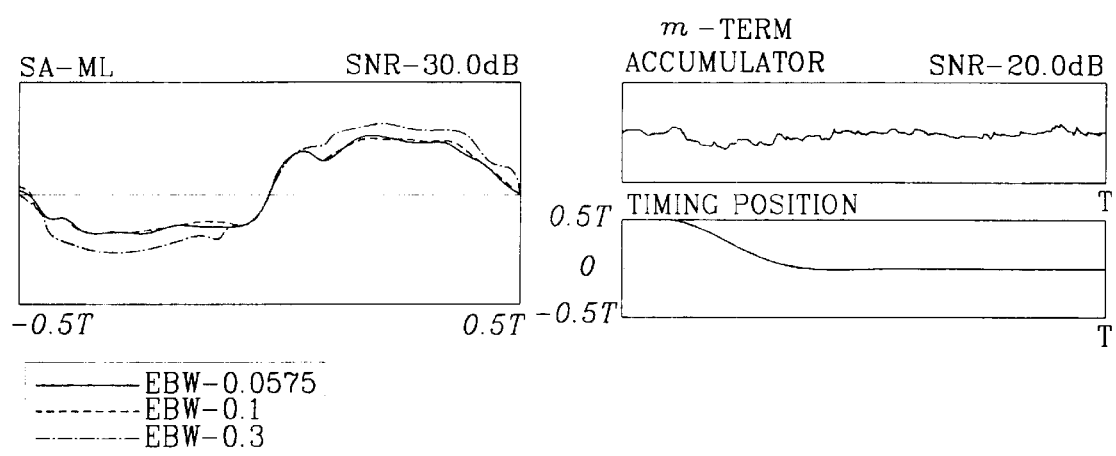

As shown in FIG. 11C, the performance in the SA-ML mode is band. In this case, if the observing symbol number M is fully increased, it is possible to obtain a good operation and to remove the multiplier 305.

Figure 12:
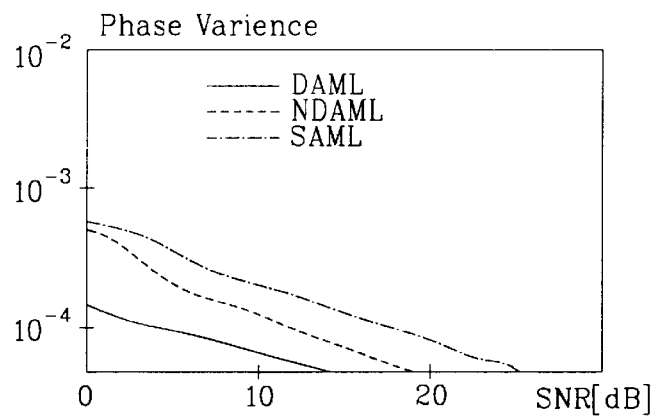
FIG. 12 is a wave form diagram illustrating a timing jitter performance according to first through third embodiments of the present invention.

FIG. 12 illustrates a log scale with respect to the normalized value $\sigma^2_{ee}/T^2$ of the phase tracing error based on the signal-noise ratio in a stable state after the initial timing is obtained with respect to the DA-ML, NDA-ML and SA-ML modes in a state that the observing interval M is set to 830.

In the first through third embodiments of FIGS. 6 through 8, the timing information is obtained for every symbol by multiplying the strobe sample (decision sample) with a difference value or approximate differential value computed from the intermediate sample at both sides with respect to the decision sample position 2k. In the fourth embodiment of the present invention, one value among the decided alphabets is decided based on the decision sample and then is multiplied with the approximate differential value.

Therefore, in the fourth embodiment of the present invention, it is possible to minimize the effects of an additive noise or ghost by multiplying the decision value with the approximate differential value. In the case that there is not noise, it is possible to decrease the timing jitter.

Figure 14:
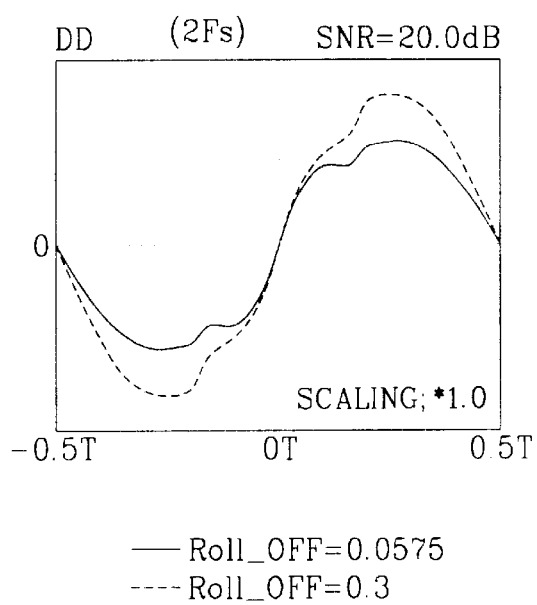
FIG. 14 is a wave form diagram illustrating a S-curve obtained based on an actual data of FIG. 13.

FIG. 14 illustrates a S-curve obtained from the actual data according to the fourth embodiment of the present invention.

As shown therein, the inclination of the S-curve is high near an actual timing point, and the linearity is good.

In the case that the roll-off factor is small, it is possible to obtain a good s-curve near the actual timing point. Therefore, the timing jitter is not affected by the roll-off factor.

Figure 15:
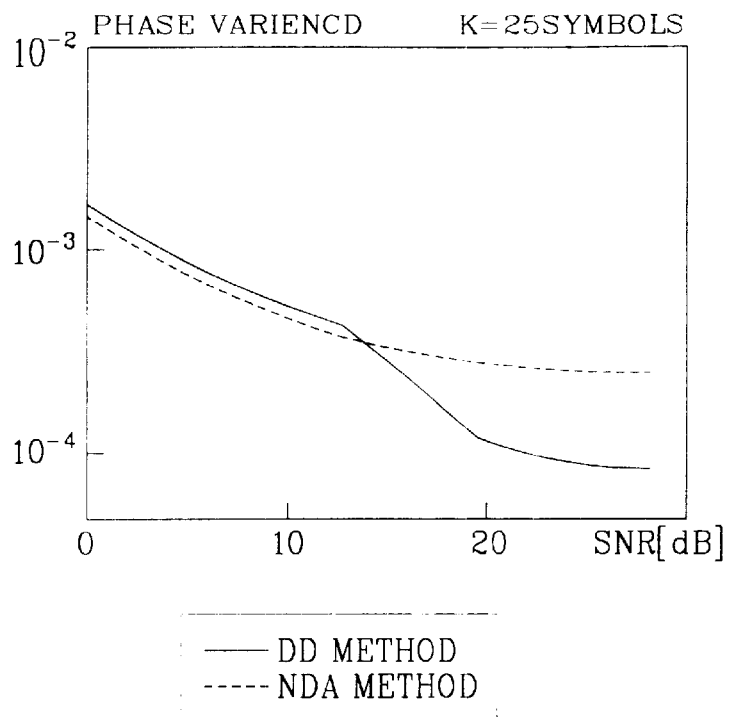
FIG. 15 is a wave form diagram illustrating the timing jitter performances of a DD-ML and a NDD-ML according to the present invention.

FIG. 15 illustrates a wave form obtained by simulating the timing jitter of the NDA-ML mode and the DD-ML mode. A high SNR channel characteristic is obtained by decreasing the observing symbol number M.

In the case of the NDA mode, even when the SNR is increased, the timing jitter is not decreased. The decrease of the timing jitter is due to the error of the timing information based on the random characteristic of the data. This is called as a self-noise.

Since the transmission signal has a certain information, the self-noise is generated as a noise component. The noise component is increased in the multi-level signal. In the fourth embodiment of the present invention, it is known that the self-noise is decreased as seen in the wave form of FIG. 15.

The NDA mode is operated when the over sampling is performed at two times(2Fs) of the symbol ratio. In the fourth embodiment of the present invention, the performance is decreased compared to 2Fs sampling. The NDA mode is performed for the Fs symbol ratio sampling.

In this case, as shown in FIG. 9, an approximate differential value at a 2k point is obtained from the samples at 2(k−1) and 2(k+1) points, not based on the intermediate sample.

In the above-described sampling operation of the fourth embodiment of the present invention, the decimeters 306 and 309 are not necessary.

Figure 16A:
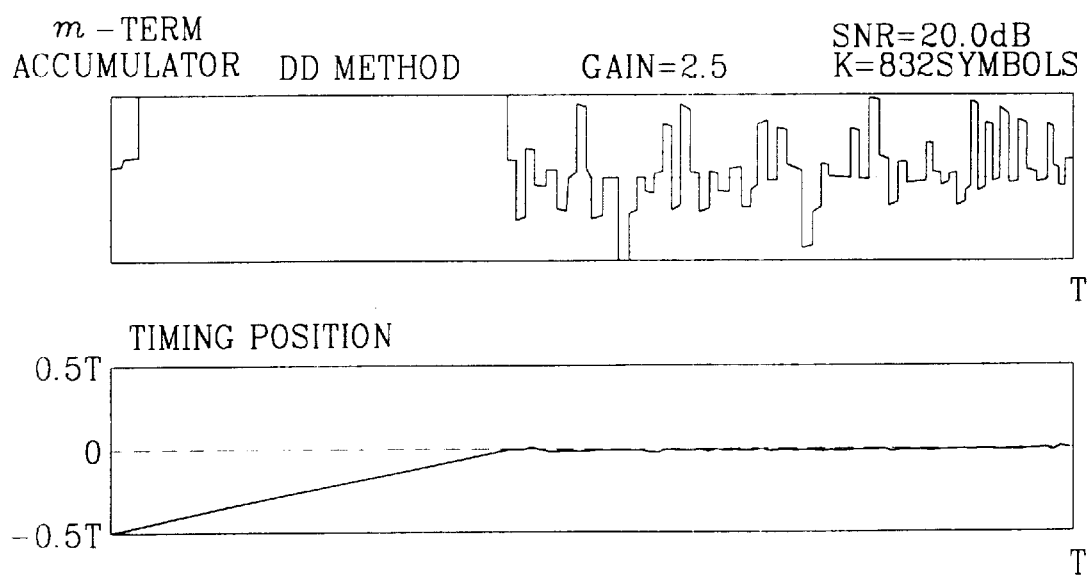
FIGS. 16A and 16B are wave form diagrams illustrating an initial timing recovering performance of FIG. 13.
Figure 16B:
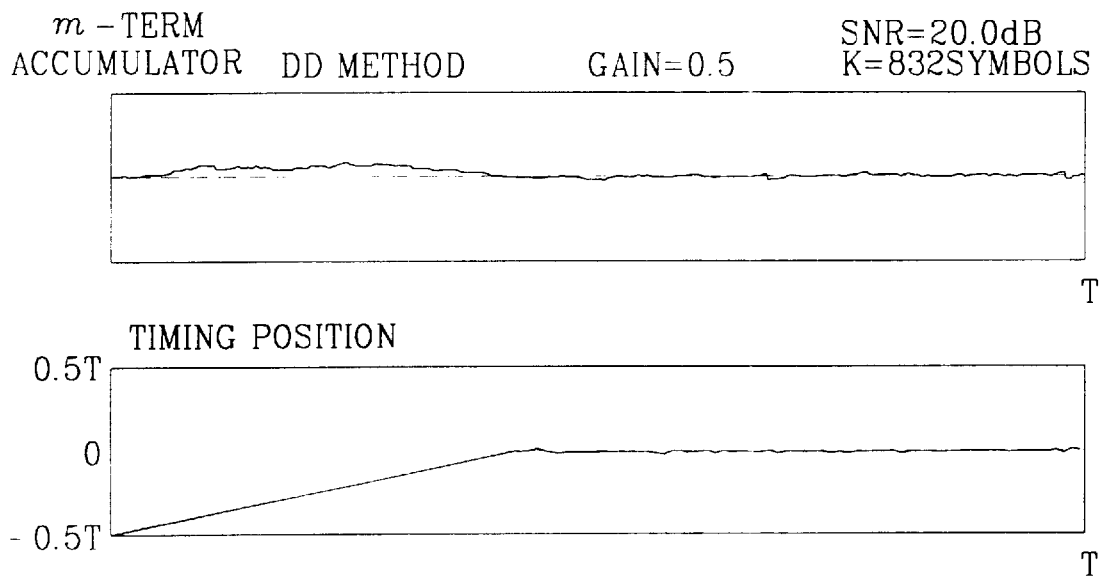

FIG. 16 is a wave form based on a simulation using a time axis as a symbol number with respect to whether the timing is obtained at an initial operation assuming that the amplitude of the signal is not adjusted in a broadcasting signal, As shown therein, the worst case is estimated by setting an initial timing position at the symbol 0.5 T or −0.5 T. In the case that the amplitude of the signal is not adjusted, there is no problem to obtain the timing even when the level is decided as an estimated multi-level.

Therefore, when the initial timing is obtained, an auto gain adjusting operation is performed based on the size of the estimated pattern(for example, sync pattern). Thereafter, a more reliable timing recovering operation is performed.

In the embodiments of the present invention, in the case of the 2Fs sampling, the timing information is extracted based on the following Equation 15.

$$e_{2k}(\tau) = \hat{a}_{2k}[q_{2k-1}(\tau)q_{2k-1}(\tau)] \quad \text{Equation 15}$$

where γ represents a step constant, $e_{2k}$ represents a decision value, $q_{2k-1}(\tau)$ and $q_{2k-1}(\tau)$ represent an intermediate sample, and K represents an observing symbol number.

When using the m-term accumulator 306, the timing update equation is as follows.

$$\tau_{nextK} = \tau_k - \Sigma e_{2k}(\tau) \quad \text{Equation 16}$$

Figure 17:
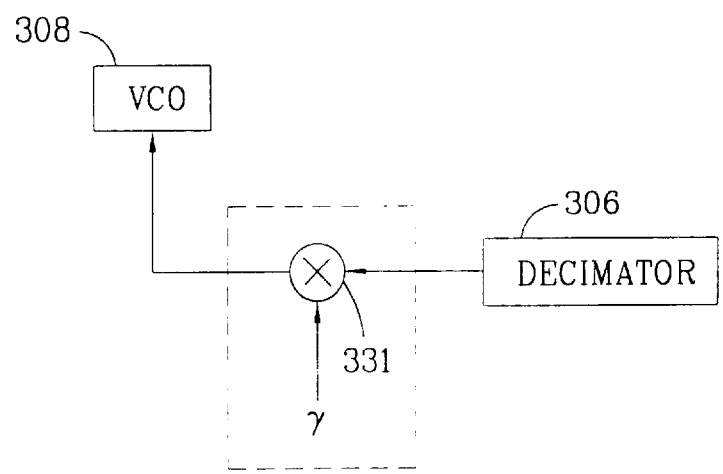
FIG. 17 is a block diagram illustrating the construction that a k-term accumulator is substituted with a multiplier according to the present invention.

As shown in FIG. 17, in the first through fourth embodiments of the present invention, the m-term accumulator 307 may be substituted with a multiplier 331 which multiplies the step constant T and an output of the decimeter 306 and outputs a result of the multiplication to the voltage adjusting oscillator 307.

Namely, the m-term accumulator 307 which operates as a loop filter of the PLL loop may be substituted with a multiplier 331 for updating the phase of the-voltage adjusting oscillator 308 by adapting the timing information which is extracted at every symbol.

At this time, the timing update Equation 17 is as follows.

$$\tau_{k+1} = \tau_k - \gamma e_{2k}(\tau) \quad \text{Equation 17}$$

The update based on Equation 16 is performed at a period by the number of the observing symbols K, and it is known that the timing update based on Equation 17 is obtained at every symbol.

In addition, in the case of the third and fourth embodiments of the present invention, it is possible to operate based on the symbol ratio Fs sampling, and the timing information extraction equation 18 is as follows.

$$e_k(\tau) = \hat{a}_k[q_{k-1}(\tau)q_{k+1}(\tau)] \quad \text{Equation 18}$$

When using the m-term accumulator 307 as a loop filter, the timing update equation 19 is as follows.

$$\tau_{nextK} = \tau_K - \Sigma e_k(\tau) \quad \text{Equation 19}$$

As shown in FIG. 17, in the case that the m-term accumulator 307 is substituted with the multiplier 331, the first recursive update equation may be expressed as in Equation 20. In this case, two decimeters 306 and 309 may be removed.

$$\tau_{k+1} = \tau_k \gamma e_{2k}(\tau) \quad \text{Equation 20}$$

In the first through fourth embodiments of the present invention, the m-term accumulator 307 is outputted to the voltage adjusting oscillator 308. If necessary, the low band pass filter (LPF) may be used for inputting a certain level DC voltage as shown in FIG. 18.

As described above, in the present invention, it is possible to recover an optimum timing by removing a timing off-set which may occur when a decision strobe sample is obtained by providing a delay unit having the same delay value as the group delay.

In addition, in the present invention, since the conventional analog differential unit is substituted with the digital differential unit, the conventional complicated signal process operation is not used. Therefore, it is possible to increase an operation speed.

In the present invention, a more simple circuit is obtained by removing the multipliers in the case of the SA-ML mode. In the SA-ML mode and DD-ML mode, when operating at a symbol ratio sampling speed Fs, two decimeters may not be used.

In the DD-ML mode of the present invention, even when the roll-off factor of the Nyquist pulse is too small, it is possible to obtain an excellent timing performance, and a stable timing performance is obtained even in the case of the additive noise or ghost.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In a digital communication system having a symbol timing recovering unit for periodically sampling a receiving signal and recovering the same, a maximum likelihood symbol timing recovering unit, comprising:

a sampler for over-sampling a matched filtering signal;

first and second delay units for sequentially delaying a sampling signal of the sampler;

an adder for adding an output of the sampler and an output of the second delay unit;

a multiplier for multiplying a decision symbol $a_k$ received in a preamble format and an output signal of the adder;

a first decimeter for outputting a certain interval value based on a decision sample position among the output of the multiplier;

an accumulator for accumulating the output of the second decimeter at a certain interval; and a voltage adjusting oscillator for providing an oscillation frequency generated using the output of the accumulator as an adjusting voltage to a 2Fs sampling clock signal of the sampler.

2. The unit of claim 1, further comprising a second decimeter for outputting a decision sample among an output signal of the first delay unit to a symbol decision unit, wherein said accumulator may be substituted with a multiplier which is capable of multiplying a step γ and an output of the second decimeter and outputting a result of the multiplication as the adjusting voltage of the voltage adjusting oscillator.

3. The unit of claim 1, wherein a differential value obtained by the first and second delay units and the adder is computed based on the following Equation:

$$\frac{dqk(\hat{\tau})}{d}\tau \cong (q_{k+1} - q_{k-1})/T, \quad \text{Equation 11}$$

where($q_{k+1}-q_{k-1}$) is a difference between the one symbol earlier value and the one symbol later value.

4. The unit of claim 1, wherein said second decimeter detects a differential value corresponding to a difference of an intermediate value of left and right samples based on a decision sample position among the outputs.

5. The unit of claim 1, wherein a low pass filter is installed between the accumulator and the voltage adjusting oscillator.

6. In a digital communication system having a symbol timing recovering unit for periodically sampling a receiving signal and recovering the same, a maximum likelihood symbol timing recovering unit, comprising:

a sampler for over-sampling a matched filtering signal;

first and second delay units for sequentially delaying a sampling signal of the sampler;

an adder for adding an output of the sampler and an output of the second delay unit;

a multiplier for multiplying an output of the first delay unit and an output signal of the adder;

a first decimeter for outputting a certain interval value based on a decision sample position among the output of the multiplier;

an accumulator for accumulating the output of the second decimeter at a certain interval; and a voltage adjusting oscillator for providing an oscillation frequency generated using the output of the accumulator as an adjusting voltage to a 2Fs sampling clock signal of the sampler.

7. The unit of claim 6, further comprising a second decimeter for outputting a decision sample among an output signal of the first delay unit to a symbol decision unit, wherein said accumulator may be substituted with a multiplier which is capable of multiplying a step γ and an output of the second decimeter and outputting a result of the multiplication as the adjusting voltage of the voltage adjusting oscillator.

8. In a digital communication system having a symbol timing recovering unit for periodically sampling a receiving signal and recovering the same, a maximum likelihood symbol timing recovering unit, comprising:

a sampler for over-sampling a matched filtering signal;

first and second delay units for sequentially delaying a sampling signal of the sampler;

a first decimeter for outputting a decision sample among an output signal of the first delay unit to a symbol decision unit;

a code deciding unit for deciding a code (±1) based on an output of the first delay unit;

an adder for adding an output of the sampler and an output of the second delay unit;

a multiplier for multiplying an output of the adder and a code of the code decision unit;

a second decimeter for outputting a certain interval value based on a decision sample position among the output of the multiplier;

an accumulator for accumulating the output of the second decimeter at a certain interval; and a voltage adjusting oscillator for providing an oscillation frequency generated using the output of the accumulator as an adjusting voltage to a 2Fs sampling clock signal of the sampler.

9. The unit of claim 8, wherein said accumulator may be substituted with a multiplier which is capable of multiplying a step γ and an output of the second decimeter and outputting a result of the multiplication as an adjusting voltage of the voltage adjusting oscillator.

10. The unit of claim 8, wherein said multiplier is substituted with an addition and subtraction unit.

11. The unit of claim 8, wherein when the operation is performed based on a Fs sampling clock signal, the first and second decimeters are removed.

12. In a digital communication system having a symbol timing recovering unit for periodically sampling a receiving signal and recovering the same, a maximum likelihood symbol timing recovering unit, comprising:

a sampler for over-sampling a matched filtering signal;

first and second delay units for sequentially delaying a sampling signal of the sampler;

a first decimeter for outputting a decision sample among an output signal of the first delay unit to a symbol decision unit;

an adder for adding an output of the sampler and an output of the second delay unit;

a symbol value estimator for deciding a symbol using an output of the first delay unit as an input;

a multiplier for multiplying an output of the symbol value estimator and an output signal of the adder;

a second decimeter for outputting a certain interval value based on a decision sample position among the output of the multiplier;

an accumulator for accumulating the output of the second decimeter at a certain interval; and a voltage adjusting oscillator for providing an oscillation frequency generated using the output of the accumulator as an adjusting voltage to a 2Fs sampling clock signal of the sampler.

13. The unit of claim 12, wherein said accumulator may be substituted with a multiplier which is capable of multiplying a step γ and an output of the second decimeter and outputting a result of the multiplication as an adjusting voltage of the voltage adjusting oscillator.

14. The unit of claim 12, wherein when the operation is performed based on a Fs sampling clock signal, the first and second decimeters are removed.

15. In a digital communication system having a symbol timing recovering unit for periodically sampling a receiving signal and recovering the same, maximum likelihood symbol timing recovering means, comprising:

clock generator means for generating an over sampling clock signal;

sampler means for over-sampling the receiving signal according to the over-sampling clock signal;

first and second delay unit means for sequentially delaying a sampling signal of the sampler means, wherein output signals of the delay unit means and the sampling signal are used to obtain an approximate inclination at a sampling point; and a logic processor means for logically processing one of a decision sample, a symbol decision value and a code of a decision sample with the approximate inclination at the sampling point, and wherein the over-sampling clock signal is adjusted according to an output of the logic processor means.

16. The unit of claim 15, further comprising:

multiplier means for multiplying said one of a decision sample, a symbol decision value and a code of a decision sample with the approximate inclination at the sampling point; and decimeter means for outputting a prescribed interval value based on a decision sample position among an output of the multiplier means, wherein the dock generator means is a voltage adjusting oscillator that generates the over-sampling clock signal using an output of the decimeter means for an adjusting voltage to a 2Fs over-sampling clock signal of the sampler means.

* * * * *